United States Patent [19]

Adams et al.

[11] Patent Number: 4,584,950
[45] Date of Patent: Apr. 29, 1986

[54] DISPLAY RACK

[75] Inventors: Jack E. Adams; Dudley D. Adams, both of Yucaipa; Heath M. Coburn, South Redlands, all of Calif.

[73] Assignee: ADCO Products, Yucaipa, Calif.

[21] Appl. No.: 705,228

[22] Filed: Feb. 25, 1985

[51] Int. Cl.$^4$ .............................................. A47F 5/08
[52] U.S. Cl. ........................................ 211/41; 211/43; 211/94; 211/94.5; 248/297.2
[58] Field of Search ........................ 211/41, 40, 43, 87, 211/59.4, 4, 94, 94.5, 162; 312/10, 12; 248/297.2

[56] References Cited

U.S. PATENT DOCUMENTS

| | | | |
|---|---|---|---|
| 3,731,817 | 5/1973 | Fowlkes et al. | 211/94.5 X |
| 3,915,306 | 10/1975 | Desisto et al. | 211/40 X |
| 4,194,636 | 3/1980 | Byram et al. | 211/94 X |
| 4,306,661 | 12/1981 | Allsop | 248/297.2 X |

FOREIGN PATENT DOCUMENTS 1584157 2/1981 United Kingdom .................. 211/40

OTHER PUBLICATIONS

Prior art photographs supplied by applicant, exhibits A, B, C, D.

Primary Examiner—Robert W. Gibson, Jr.
Attorney, Agent, or Firm—K. H. Boswell

[57] ABSTRACT

A display rack for video tape containers and other similar articles includes a support rack which is fixed to a support surface. A plurality of bracket members are connected to the support rack utilizing a combination of two opposing channels and two projections. The projections fit into the channels to join the bracket members to the support rack. Friction engaging elements are located on both the support member and the bracket members allowing for sliding of the bracket members along the support member but locking of the position of the bracket members on the support member by the frictional engagement of the frictional elements. The bracket members include opposing side flanges connected by a web with the flanges attaching to a back plate at an angle of, for instance, 45° for optimum display of the articles supported by the display rack.

18 Claims, 5 Drawing Figures

Fig. 1.

DISPLAY RACK

BACKGROUND OF INVENTION

This invention is directed to a display rack having adjustable brackets capable of being freely positionable in a plurality of positions, and shaped so as a first and second bracket can slidingly receive a container between first and second flanges on each of the first and second brackets to temporarily retain the container on the bracket.

With the advent of inexpensive video recorders, the renting of copies of movies for leisurely viewing the same in one's home has become a very popular activity. The copies of the video tapes of movies, or other media, must be protected in a protective case in order to maintain their quality. The protective case is then usually inserted within a container bearing indicia thereon indicative of the contents of the video tapes or the like. Since video tapes are easily susceptible to abuse, they must be stored in a manner which protects them yet allows for easy access and browsing by the consumer.

The indicia on the containers for video tapes is positioned much like the indicia for books and the like. The side edges, because of the limited surface area thereon, can usually contain nothing more than a printed title. The front and back surfaces, because of the larger surface area, can include more elaborate displays including pictorial material as well as printed material. It is these front and back surfaces, especially the front surface, which bear the indicia which is recognizable by the consumer so as to identify the contents, a movie or the like, which is recorded on the video tape within.

Initially, the vendors of these video tapes could only display the video tapes in one of two ways. The first of these is much like a book shelf wherein only the side edge of the container is displayed, and, thus, little more than the title is available for viewing by the consumer. While this allows for storage of a large amount of video tapes per square foot of storage area, it does not lend to adequate display of the tapes allowing for easy recognition of the contents by the consumer, nor is it conducive to browsing by the consumer. A second way of displaying these is much like that utilized for paper back books and the like, wherein tilted display racks, having a bottom lip, are utilized with the video tape container placed such that it is, essentially, in the same plane as the wall on which the rack is mounted. While this leads to full display of the indicia of the front surfaces of the container, it also severely reduces the number of individual video tapes which can be displayed because of the large surface area each individual tape container occupies.

Additionally, because different formats are utilized by the manufacturer of video tape machines, there are different size video tapes and, consequently, different size containers for the same. Because of this, display racks which were designed to accommodate all size video tapes are very wasteful with regard to space utilization when displaying video tape containers which are of a size less than the maximum size. This leads to further waste in the utilization of display surface for video tapes and other similar articles.

In view of the above, it is a broad object of this invention to provide a display rack which is capable of efficient space utilization, but is also capable of displaying the front surfaces of containers, books, or the like, which bear indicia thereon. It is a further object of this invention to provide a display rack which has the capabilities of adjustments of the individual elements which are utilized to support the contents of the rack such that a mixture of elements of different sizes can be displayed on the same rack, yet optimum space utilization is still achieved. It is a further object of this invention to provide a display rack which, because of its manufacturing and engineering principles embodied therein, is capable of a long and useful lifetime, and capable also of economical manufacturing.

These and other objects, as will be evident from the remainder of this specification, are achieved in a display rack that comprises: a support member; at least two bracket members; said support member comprising an integrally formed elongated element having a front surface, a back surface, left and right side edges, and top and bottom edges; said back surface of said support member including at least a portion thereof which lies in the plane so as to be positionable against a flat support surface; said bracket members each including a back plate and a holding element formed as an integral unit, said holding element extending from said back plate at an acute angle; said holding element including first and second flanges located in a parallel-planar configuration with respect to each other and further including a web orthogonally located with respect to each of said first and said second flanges and extending between said first and said second flanges; one of said support member and said bracket member including first and second channel integrally formed on said one of said support member and said bracket, said first and second channels spaced apart from one another and oriented with respect to one another so as to open toward one another; the other of said support member and said bracket member including first and second elongated projection means, said first and said second elongated projection means sized and shaped and located in a spaced relationship on said other of said support member and said bracket member such that said first of said projection means fits into first said channel and said second of said projection means fits into said second channel; said one of said channels or said projection means which is located on said support member being positioned on said support member so as to be parallel with the left and right side edges of said support member and said one of said channel means and said projection means which is located on said bracket member being positioned on said bracket member so as to be parallel with the plane of said flanges of said bracket member and perpendicular to said web of said bracket member; said bracket members attaching to said support member by inserting said first and said second projection means into said first and said second channels at one of said top or said bottom edges of said support member to position said back plate of said support brackets against said face surface of said support member and further said bracket means positionable along the elongated dimension of said support member by sliding said bracket members along the elongated dimension of said support member whereby said first and said second projection means slide within said first and said second channels; means for temporarily retaining each of said bracket means at a position along the elongated length of said support member.

These objects are further achieved in the illustrative embodiment by including a channel on the support member whereby the support member can be attached to a supporting surface utilizing common screws, nails, and the like, with the heads of the screws, nails, or the like recessed behind the locus of travel behind the back plate of the bracket member whereby the bracket member can be easily slid along the length of the support member without interference of the connecting screws, nails, or the like.

Additionally, in the illustrative embodiment, the objects are met by locating the first and second channels along the left and right side edges, respectively, of the support member and forming the projecting means as extensions, projecting from the back plate of the bracket member.

Further, in the illustrative embodiment, the means for temporarily retaining the bracket member on the support member is achieved by providing a first frictional engagement means on a support member and a second frictional engagement means on a bracket member whereby these two frictional engagement means engage with one another so as to temporarily retain the bracket member in any particular position which it is positioned in along the elongated length of the support member.

BRIEF DESCRIPTION OF THE DRAWINGS

This invention will be better understood when taken in conjunction with the figures wherein.

The invention described in this specification and illustrated in the drawings utilizes certain principles and/or concepts as are set forth in the claims appended hereto. Those skilled in the arts to which this invention pertains will realize that these principles and/or concepts are capable of being utilized in a variety of embodiments which may differ from the exact embodiment utilized for illustrative purposes herein. Because of this, this invention is not to be construed as being limited solely to the illustrated embodiment, but should only be construed in view of the claims.

DETAILED DESCRIPTION OF THE INVENTION

Figure 1:
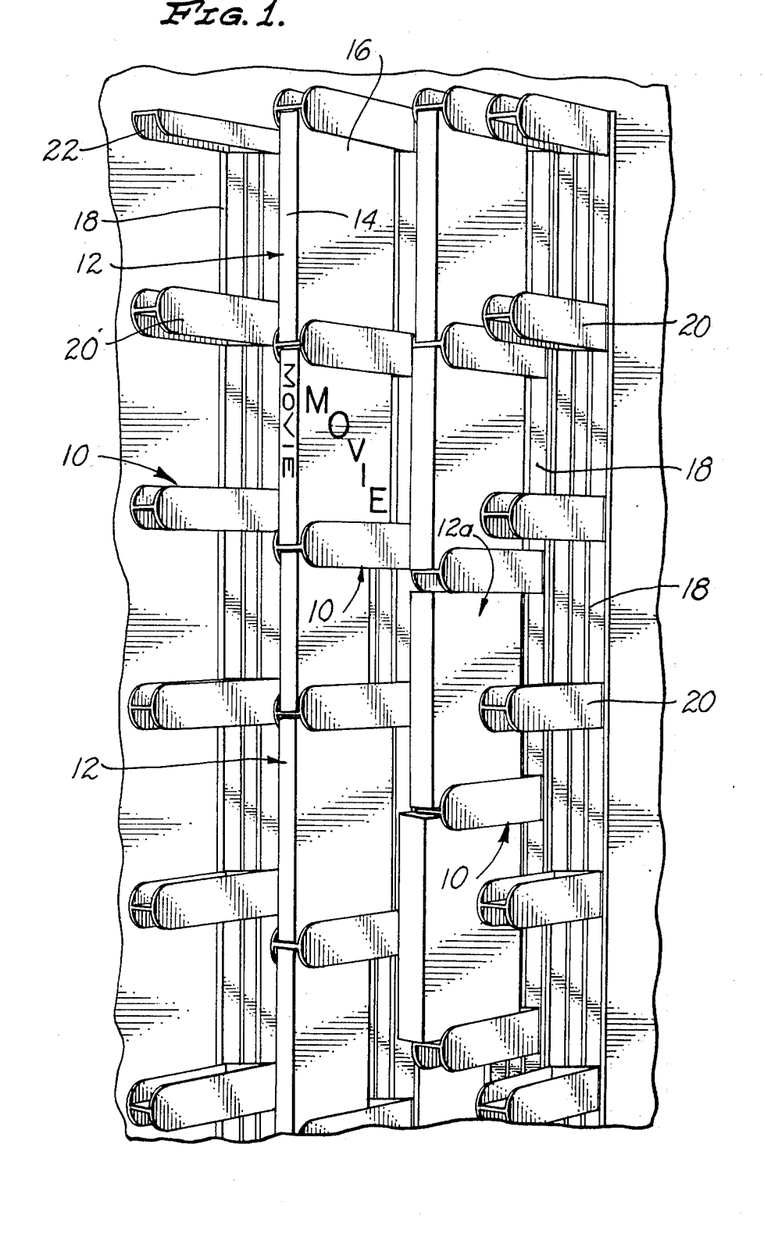
FIG. 1 is an isometric view showing multiples of the display rack of the invention as used in conjunction with a plurality of containers located on certain of the display racks shown on FIG. 1.

In FIG. 1 there are shown multiples of the display rack 10 of the invention. Four (4) individual display racks 10 are illustrated therein. The racks 10 on the outside of the figure, that is the one on the rightmost side and the one on the leftmost side, are shown in an empty configuration and the two in the center are shown with appropriate video tape containers 12 located on the display rack.

Several things are evident from viewing FIG. 1 with regard to the display rack 10 of the invention. The first of these is that a high density of items can be contained in the display rack 10, yet the items are displayed in such a manner that both an edge and the front face of the containers are visible. Further, as is readily apparent from the two center display racks 10 of FIG. 1, containers of different sizes can be accommodated by the display rack 10 which leads to versatility of usage of the space occupied by the display rack 10 for optimum display of the containers accommodated in the display rack 10. The optimum display of these containers takes into account display of both number as well as viewability of the surface of the containers.

As is evident from the two display racks 10 on the right hand side of FIG. 1, the individual display racks 10 are positionable right next to one another with zero (0) clearance between the same, again leading to optimum usage of the surface area which is occupied by the display racks 10. Even in view of this zero (0) clearance, it is extremely simple to insert and remove the individual containers from the display racks 10 by simply sliding them, essentially, to the left and toward the viewer of FIG. 1. Insertion of containers in the display racks 10 is just the opposite, that is, to the right and into the plane of the figure.

While the containers are easily removed and inserted when the containers are located on the display racks 10, they are fully supported and secured against dislodging of the same. If the side edge 14 of one of the containers 12, is bumped, this will not dislodge the container from the display rack 10. If the front edge 16 is likewise bumped, again this will not dislodge the container 12 from the display rack 10. Only movement of the container 12 outward and to the left of FIG. 1, will serve to remove the container 12 from the display rack 10.

The individual display racks 10 have two component parts. The first of these is a support member 18. The support members 18 of the display racks 10 are easily attached, as hereinafter explained, to a support surface. The further component of the display rack 10 is the bracket member 20.

Each of the individual bracket members 20 are freely positionable along the entire elongated length of the support members 18 by sliding of the same. However, once slid to a position, they are frictionally retained at that position against further movement such that once two particular brackets 20 are located with respect to one another along the length of the support member 18, at a distance so as to conveniently accommodate one of the containers 12, these two brackets will remain in this position allowing for retention of the container 12, between the bracket members 20, in a safe and secure manner.

Also shown in FIG. 1, in the upper left hand corner, is a further bracket member 22 which differs from the bracket members 20 in that it is adapted so as to only engage a single container and not two containers as are the other brackets 20. The brackets 22 can be utilized as the topmost and bottommost bracket for a particular display rack 10. Use of the brackets 22 contribute to a more finished appearance along the top and bottom edges of a display rack 10. However, it is not necessary to utilize the brackets 22 for the display racks 10. As is evident from the remainder of the display racks 10 shown in FIG. 1, the brackets member 20 can be utilized for the topmost bracket on any particular display rack 10, and while not shown in FIG. 1, can also be utilized for the bottommost bracket. The bottom of the display racks 10 would be the same as the top of the display racks 10, and can be visualized by simply inverting FIG. 1.

Figure 2:
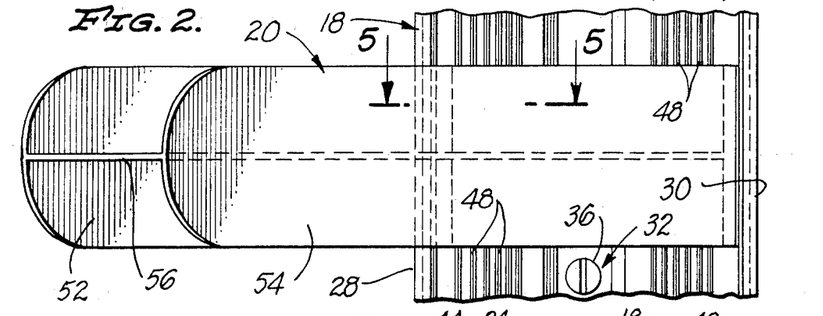
FIG. 2 is a front elevational view of a portion of one of the display racks of FIG. 1.
Figures 3, 4:
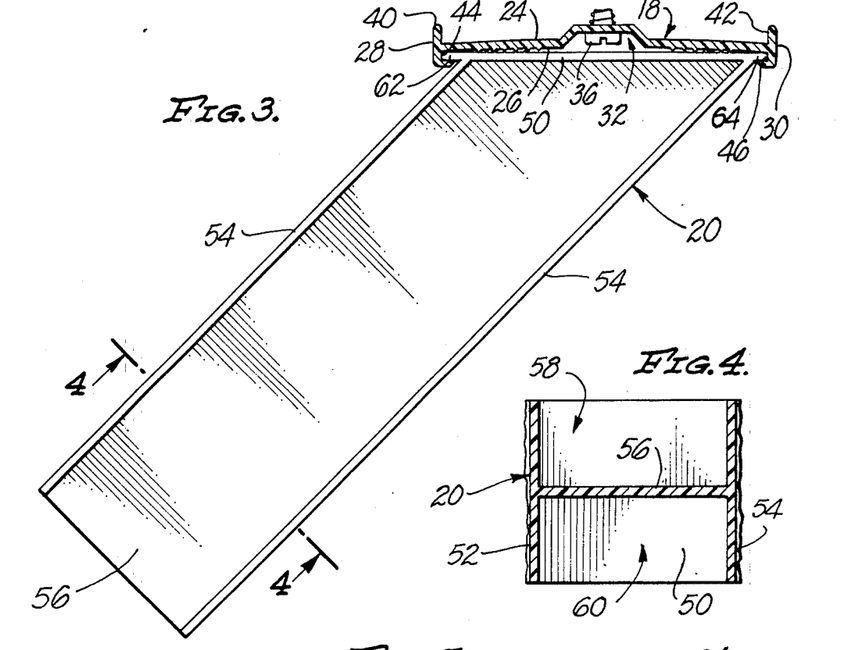
FIG. 3 is a top plan view of the invention.
FIG. 4 is an sectional view along the lines 4—4 of FIG. 3.
Figure 5:
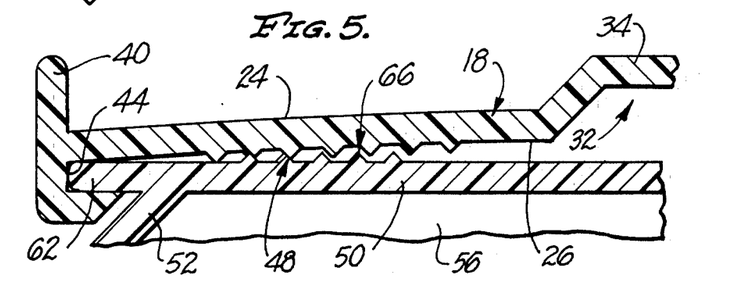
FIG. 5 is a fragmentary sectional view along the lines 5—5 of FIG. 2.

Referring now to FIGS. 2, 3, and 5, the support member 18 will be described. The support member 18 comprises an elongated extrusion which includes a back surface 24, a front surface 26, a left side edge 28, a right side edge 30, and a top and bottom edge, not separately identified or numbered, which would look exactly like FIG. 3 if the sectional shading of FIG. 3 were removed.

Centered along the length of the support member 18 is an elongated connecting channel 32. The channel 32 is depressed inwardly from the surface 26 and extends outwardly from the back surface 24. It, thus, represents a depression in the front surface 26. The back wall 34 of the channel 32 is adapted to lie in a plane and fit flush against a flat support surface on which the display rack 10 is mounted.

The connecting channel 32 accommodates the head 36 of a screw, nail, or other similar connecting implement, which is utilized to attach the display rack 10 to a support surface. As can be seen in FIG. 3, screw head 36 is recessed within the connecting channel 32 so it does not interfere with the operation of the bracket members 20, as hereinafter described. The screw body 38 extends through the wall of the connecting channel 32 and into the appropriate support surface to which the display rack 10 is attached. By inserting a plurality of screws along the length of the support member 18, support member 18 can be easily and conveniently attached to an appropriate support surface. Alternately, nails or other similar fastening implements can be just as easily and conveniently utilized.

While not shown in the drawings, it is also possible to use a suitable glue, or the like, to glue the support member 18 to a support surface, utilizing the back wall 34 of the connecting channel 32 as the main attachment point. The connecting channel 32, however, leads to the ease and versatility of use of the display rack 10 insofar as three or four screws along the length of the support member 18 will serve to support the display of seven (7) to ten (10) containers (depending on the particular size of the container) along the length of the support member 18.

Extending along the left and right side edges of the support member 18 are a left flange 40 and a right flange 42. These flanges terminate in the same plane as the plane of the back wall 34 of the connecting channel 32. The back edges of these flanges 40 and 42, thus, abut against the support surface to which the support member 18 is attached.

Also along the right and left hand edges of the support member 18 are right and left side channels 44 and 46 respectively. Each of the channels 44 and 46 are positioned such that the respected openings of the channels open toward one another, that is the channels 44 and 46 are opposing with respect to one another. The channels 44 and 46 continue along the entire length of the left and right hand edges 28 and 30 of the support member 18 and, thus, are parallel with one another along the totality of the length of the support member 18.

As is best seen in FIG. 5, located between the appropriate left and right side channels 44 or 46, and the connecting channel 32, are a plurality of ridges collectively identified by the numeral 48. These ridges also extend along the totality of the length of the support member 18, and are parallel to one another and also to the left and right hand side edges 28 and 30 of the support member 18. The purposes of the ridges will be discussed below.

As is evident from viewing FIG. 3, the support member 18 can be conveniently extruded utilizing a die lending to the ease of manufacture and, thus, the economy of the display racks 10.

The bracket member 20 is shown in FIGS. 2, 3, and 4. The bracket member 20 is an integrally formed unit having a back plate 50 from which extend, at an acute angle, left flange 52 and right flange 54. Positioned between the flanges 52 and 54 is a web 56 which connects the flanges. The web 56 is positioned in the center of the flanges 52 and 54 so as to divide each of the bracket members in two, forming an upper pocket 58 and a lower pocket 60. As is evident from FIG. 1, the upper pocket 58 of a first bracket member 20 is utiized in conjunction with the lower pocket 60 of a second bracket member 20 so as to support a container 12. The container 12 rests on the web 56 of lower bracket member 20 normally with a small gap located between the web 56 of the upper bracket member 20 and the top of the container 12 so as to allow for easy insertion and removal of the containers 12 from between the two bracket members 20. For purposes of illustration, this gap has been exaggerated with respect to the container 12A in the second row of the display rack 10 of FIG. 1.

The two flanges 52 and 54 and the web 56 together form a holding element for each of the bracket members 20. The flanges 52 and 54 are spaced with respect to one another in a parallel-planar relationship with the web 56 then positioned orthogonally with respect to each of the flanges 52 and 54. All three of these are then joined to the rear plate 50 of the bracket member 20.

Extending outwardly on both the left and right hand sides of the rear plate 50 is a left projection 62 and a right projection 64. The projections 62 and 64 extend along the vertical dimension of the rear plate 50 and are sized and shaped so as to be positionable in the channels 44 and 46 of the support member 18. The bracket members 20 are attached to the support member 18 by sliding the bracket members either downwardly into the top edge of the support member 18 or upwardly into the bottom edge of the support member 18. In any event, the projections 62 and 64 are introduced into the channels 44 and 46. Once introduced into the channels, the bracket members 20 are only moveable up and down along the length of the support member 18 and are not moveable either by twisting or by pulling to the left or right.

On the backside of the rear plate 50 is a second plurality of ridges collectively identified by the numeral 66. As is evident from FIG. 5, the ridges 66 are not spaced apart from one another in the same spacing as are the ridges 48. Because of this, one or more members of the group of ridges 66 engage a member of the group of ridges 48 and frictionally fit against it, much like cross threading of a screw thread. The ridges 66 are positioned so as to be parallel with the ridges 48 allowing for sliding of the bracket members 20 along the elongated dimension of the support member 18 against the frictional fit of the ridges 66 and 48. There is, however, sufficient frictional engagement between the ridges 66 and 48 so as to require a definite force to slide the bracket members 20 along the support member 18. And once this sliding force is removed, the bracket members 20 will stay in a fixed position on the support member 18.

It can be seen that the bracket members 20 can easily be repositioned along the support member 18 so as to make it easy and convenient for repositioning of the bracket members 20 to accommodate different size containers 12.

Also noticeable in FIG. 5, since the ridges 66 and 48 do not have the same spacing with respect to one another, that there is a limited amount of bowing of the support member 18 when the bracket members 20 are introduced into the channels 44 and 46. This contributes to the frictional engagement of the bracket members 20 along the length of the support member 18. In the illustrative embodiment, the projections 62 and 64 are slightly undersized with respect to the dimensions of the channels 44 and 46 such that they are very easily introduced into these channels. But once introduced into the channels, and the ridges 48 engage the ridges 66, there is a slight flexure of the support member 18 to engage the projections 62 and 64 against one surface or the other of the channels 44 and 46.

The ends of the flanges 52 and 54 are arcuate in shape, curving in smooth arcs so as not to protrude with sharp corners, and to further assist with the insertion of the containers 12 onto the display racks 10.

The flanges 52 and 54 are oriented with respect to the back plate 50 at an acute angle as was noted above. It has been found that by positioning the flanges 52 and 54 at about a 45° angle with respect to the back plate 50, optimum space usage in conjunction with display of the front surface of the containers 12 is achieved. By utilizing a smaller angle, as for instance 30°, the front surfaces of the containers 12 are oriented at a flatter projection toward the observer. However, since the width of the back plate 50 must be increased to accommodate this, a smaller number of display racks 10 can be accommodated on a support surface. By increasing the angle to a greater angle, as for instance 60°, the width of the back plate 50 which can accommodate this angle, is decreased, increasing the number of display racks 10 which can be positioned on any particular support surface. However, this is done with a lose of display of the front surface of the containers 12 located in the display racks 10. When the flanges 52 and 54 are positioned at about 45° to the back plate 50, an optimum is achieved between the number of display racks 10 which can be accommodated on a particular surface and the display of the front surface of the containers 12 which are loaded onto the display rack 10.

Since the support members 18 can be located side by side on a supporting wall, it is evident that a large number of display racks 10 can be mounted to a particular wall surface. As noted above, the support members 18 can be easily made by extrusion techniques. The bracket members 20 can be conveniently made, utilizing injection molding techniques. Thus, the display racks 10 are conveniently made of any mountable moldable material which leads to their economy of manufacture.

While the display racks 10 have been illustrated in conjunction with containers 12 for storage of video tapes, it is evident that other articles of manufacture, such as books, paperbacks, records, cassette tapes, computer cassettes, or the like, can also be conveniently and easily displayed utilizing display racks 10 which are manufactured in dimensions to accommodate these other articles. For use with displaying video tape containers 12, the display racks 10 increase the display surface of individual containers two and one-half times over that utilizing shelf displays. It is evident that with this increase of display capacity, a smaller display space can be utilized to display a fixed number of containers, thus increasing the amount of titles available to the consumer, and/or decreasing the amount of display space needed by the retailer for a fixed number of titles.

We claim:

1. A display rack that comprises:
   a support member;
   at least two bracket members;
   said support member comprising an integrally formed elongated element having a front surface, a back surface, left and right side edges, and top and bottom edges;
   said back surface of said support member including at least a portion thereof which lies in a plane so as to be positionable against a flat support surface;
   said bracket members each including a back plate and a holding element formed as an integral unit, said holding element extending from said back plate at an acute angle;
   said holding element including first and second flanges located in a parallel-planar configuration with respect to each other and further including a web orthogonally located with respect to each of said first and said second flanges and extending between said first and said second flanges;
   one of said support member and said bracket member including first and second channels integrally formed on said one of said support member and said bracket, said first and second channels spaced apart from one another and oriented with respect to one another so as to open toward one another;
   the other of said support member and said bracket member including first and second elongated projection means, said first and said second elongated projection means sized and shaped and located in a spaced relationship on said other of said support member and said bracket member such that said first of said projection means fits in said first channel and said second of said projection means fits into said second channel;
   said one of said channels or said projection means which is located on said support member being positioned on said support member so as to be parallel with the left and right side edges of said support member and said one of said channel means and said projection means which is located on said bracket member being positioned on said bracket member so as to be parallel with the plane of said flanges of said bracket member and perpendicular to said web of said bracket member;
   said bracket members attaching to said support member by inserting said first and said second projection means into said first and said second channels at one of said top or said bottom edges of said support member to position said back plate of said support brackets against said face surface of said support member and further said bracket means positionable along the elongated dimension of said support member by sliding said bracket members along the elongated dimension of said support member whereby said first and said second projection means slide within said first and said second channels;
   means for temporarily retaining said bracket members in a position on said support member, said means comprising a first frictional engagement means located on said front surface of said support member and a second frictional engagement means located on said back plate of each of said bracket members, said first frictional engagement means frictionally engaging with said second frictional engagement means so as to temporarily retain said bracket members in fixed positions on said support members.

2. The display rack of claim 1 wherein:
said first and said second channels are positioned on said support member along the left and right side edges of said support member and extend from said top edge of said support member to said bottom edge of said support member.

3. The display rack of claim 2 wherein:
said first and said second projection means are located on said bracket member and comprise extensions of said back plate of said bracket member extending beyond said first and said second flanges of said holding element of said bracket member.

4. The display rack of claim 1 wherein:
said support member includes an elongated connecting channel extending from the top edge of said support member to said bottom edge of said support member, said connecting channel extending from said front surface of said support member to said back surface of said support member so as to form a concave recess in said front surface and a convex projection on said back surface whereby said back surface of said support member along the length of said convex projection lies in said plane which is positionable against a flat support surface;
said concave recess sized and shaped so as to contain the head of a screw or nail and to position said head of said screw or said nail below the plane of the front surface of said support member whereby said head of said screw or said nail does not impede the movement of said bracket members as said bracket members are slid along the elongated dimension of said support member.

5. The display rack of claim 1 wherein:
each of said bracket members when attached to said support member extends from the plane of the front surface of said support member at a 45° angle.

6. The display rack of claim 1 wherein:
each of said first and said second flanges of said holding element of said support members distal from said back plate of said bracket member arcuately curve from the top edge of the respective flange to the bottom edge of the respective flange.

7. The display rack of claim 6 wherein:
said web of said holding element of said bracket members is positioned equal distance between the top and bottom edges of each of said first and second flanges of each of said holding elements of said bracket members.

8. The display rack of claim 4 wherein:
said first and said second channels are positioned on said support member along the left and right side edges of said support member and extend from said top edge of said support member to said bottom edge of said support member;
said first and said second projection means are located on said bracket member and comprise extensions of said back plate of said bracket member extending beyond said first and said second flanges of said holding element of said bracket member.

9. The display rack of claim 3 wherein:
each of said bracket members when attached to said support member extends from the plane of the front surface of said support member at a 45° angle.

10. The display rack of claim 4 wherein:
each of said bracket members when attached to said support member extends from the plane of the front surface of said support member at a 45° angle.

11. The display rack of claim 4 wherein:
said support member further includes left and right side elongated flanges extending along the respective left and right side edges of said support member between said top and said bottom edges with the rear most portion of said left and right side flanges located in said plane which is positioned against the flat support surface.

12. A display rack that comprises:
a support member;
at least two bracket members;
said support member comprising an integrally formed elongated element having a front surface, a back surface, left and right side edges, and top and bottom edges;
said back surface of said support member including at least a portion thereof which lies in a plane so as to be positionable against a flat support surface;
said bracket members each including a back plate and a holding element formed as an integral unit, said holding element extending from said back plate at an acute angle;
said holding element including first and second flanges located in a parallel-planar configuration with respect to each other and further including a web orthogonally located with respect to each of said first and said second flanges and extending between said first and second flanges;
one of said support member and said bracket member including first and second channels integrally formed on said one of said support member and said bracket, said first and second channels spaced apart from one another and oriented with respect to one another so as to open toward one another;
the other of said support member and said bracket member including first and second elongated projection means, said first and said second elongated projection means sized and shaped and located in a spaced relationship on said other of said support member and said bracket member such that said first of said projection means fits into said first channel and said second of said projection means fits into said second channel;
said one of said channels or said projection means which is located on said support member being positioned on said support member so as to be parallel with the left and right side edges of said support member and said one of said channel means and said projection means which is located on said bracket member being positioned on said bracket member so as to be parallel with the plane of said flanges of said bracket member and perpendicular to said web of said bracket member;
said bracket members attaching to said support member by inserting said first and said second projection means into said first and said second channels at one of said top or said bottom edges of said support member to position said back plate of said support brackets against said face surface of said support member and further said bracket means positionable along the elongated dimension of said support member by sliding said bracket members along the elongated dimension of said support member whereby said first and said second projection means slide within said first and said second channels;
means for temporarily retaining each of said bracket means at a position along the elongated length of said support members, said means comprising a first frictional engagement means located on said support member and a second frictional engagement means located on each of said bracket members, said first frictional engagement means frictionally engaging with said second frictional engagement means so as to temporarily retain said bracket members in fixed positions on said support members;

said first frictional engagement means comprises a plurality of elongated ridges located on said front surface of said support member and extending from said top edge to said bottom edge parallel to said left and right side edges of said support members;

said second frictional engagement means comprises a plurality of elongated ridges positioned on the back side of back plate of said back member and extending essentially perpendicular to the plane of said first and second flanges of said holding element of said bracket member.

13. The display rack of claim 12 wherein:
the spacing between the individual ridges of said plurality of ridges on said support member is different from the spacing between the individual ridges of said plurality of ridges on said bracket member whereas when said bracket member is attached to said support member some of said ridges on said bracket member fit between some of said ridges on said support member and further of said ridges on said bracket member engage further of said ridges on said bracket member.

14. The display rack of claim 12 wherein:
said first and said second channels are positioned on said support member along the left and right side edges of said support member and extend from said top edge of said support member to said bottom edge of said support member;
said first and said second projection means are located on said bracket member and comprise extensions of said back plate of said bracket member extending beyond said first and said second flanges of said holding element of said bracket member.

15. The display rack of claim 12 wherein:
said support member includes an elongated connecting channel extending from the top edge of said support member to bottom edge of said support member and recessed from said front surface of said support member towards said back surface of said support member whereby said back surface of said support member along the length of said channel lies in said plane which is positionable against a flat support surface;
said channel sized and shaped so as to contain the head of a screw or nail and to position said head of said screw or said nail below the plane of the front surface of said support member whereby said head of said screw of said nail does not impede the movement of said bracket members as said bracket members are slid along the elongated dimension of said support member.

16. The display rack of claim 12 wherein:
each of said bracket members when attached to said support member extends from the plane of the front surface of said support member at a 45° angle.

17. A display rack that comprises:
a support member;
at least two bracket members;
said support member comprising an integrally formed elongated element having a front surface, a back surface, left and right side edges, and top and bottom edges;

said back surface of said support member including at least a portion thereof which lies in a plane so as to be positionable against a flat support surface;

said bracket members each including a back plate and a holding element formed as an integral unit, said holding element extending from said back plate at an acute angle;

said holding element including first and second flanges located in a parallel-planar configuration with respect to each other and further including a web orthogonally located with respect to each of said first and said second flanges and extending between said first and said second flanges;

one of said support member and said bracket member including first and second channels integrally formed on said one of said support member and said bracket, said first and second channels spaced apart from one another and oriented with respect to one another so as to open toward one another;

the other of said support member and said bracket member including first and second elongated projection means, said first and said second elongated projection means sized and shaped and located in a spaced relationship on said other of said support member and said bracket member such that said first of said projection means fits in said first channel and said second of said projection means fits into said second channel;

said one of said channels or said projection means which is located on said support member being positioned on said support member so as to be parallel with the left and right side edges of said support member and said one of said channel means and said projection means which is located on said bracket member being positioned on said bracket member so as to be parallel with the plane of said flanges of said bracket member and perpendicular to said web of said bracket member;

said bracket members attaching to said support member by inserting said first and said second projection means into said first and said second channels at one of said top or said bottom edges of said support member to position said back plate of said support brackets against said face surface of said support member and further said bracket means positionable along the elongated dimension of said support member by sliding said bracket members along the elongated dimension of said support member whereby said first and said second projection means slide within said first and said second channels;

means for temporarily retaining each of said bracket means at a position along the elongated length of said support member;

said support member includes an elongated connecting channel extending from the top edge of said support member to said bottom edge of said support member, said connecting channel extending from said front surface of said support member to said back surface of said support member so as to form a concave recess in said front surface and a convex projection on said back surface whereby said back surface of said support member along the length of said convex projection lies in said plane which is positionable against a flat support surface;

said concave recess sized and shaped so as to contain the head of a screw or nail and to position said head of said screw or said nail below the plane of the front surface of said support member whereby said head of said screw or said nail does not impede the movement of said bracket members as said bracket members are slid along the elongated dimension of said support member.

18. The display rack of claim 17 wherein:
said means for temporarily retaining said bracket members in a position on said support member comprises a first frictional engagement means located on said support member and a second frictional engagement means located on each of said bracket members, said first frictional engagement means frictionally engaging with said second frictional engagement means so as to temporarily retain said bracket members in fixed positions on said support members.

* * * * *

UNITED STATES PATENT AND TRADEMARK OFFICE
CERTIFICATE OF CORRECTION

PATENT NO. : 4,584,950

DATED : April 29, 1986

INVENTOR(S) : Jack E. Adams; Dudley D. Adams; Heath M. Coburn

It is certified that error appears in the above-identified patent and that said Letters Patent is hereby corrected as shown below:

Column 5, line 48, "respected" should be --respective--.
Column 7, line 34, "lose" should be --loss--.
Column 11, line 16, the second occurrence of the word "back" should be --bracket--.
Column 11, line 30, "bracket" should be --support--.
Column 11, line 56, the second occurrence of the word "of" should be --or--.

Signed and Sealed this

Fourth Day of November, 1986

[SEAL]

Attest:

DONALD J. QUIGG

*Attesting Officer*  *Commissioner of Patents and Trademarks*